US005928303A

United States Patent [19]

Sakai

[11] Patent Number: 5,928,303
[45] Date of Patent: Jul. 27, 1999

[54] DIAGNOSTIC SYSTEM FOR DIAGNOSING DETERIORATION OF HEATED TYPE OXYGEN SENSOR FOR INTERNAL COMBUSTION ENGINES

[75] Inventor: Shoichi Sakai, Gunma, Japan

[73] Assignee: Unisia Jecs Corporation, Atsugi, Japan

[21] Appl. No.: 08/967,541

[22] Filed: Nov. 12, 1997

[30] Foreign Application Priority Data

Nov. 12, 1996 [JP] Japan .................................... 8-300386

[51] Int. Cl.[6] ........................... F02D 41/14; G01M 15/00

[52] U.S. Cl. ......................... 701/109; 73/23.31; 73/118.1

[58] Field of Search ............................... 73/23.31, 23.32, 73/116, 117.2, 117.3, 118.1; 701/101, 103, 109; 60/276, 277

[56] References Cited

U.S. PATENT DOCUMENTS 4,732,128 3/1988 Yoshioka et al. ...................... 73/23.31
4,938,196 7/1990 Hoshi et al. ........................... 73/23.32
5,513,522 5/1996 Seki et al. .............................. 73/23.31
5,544,640 8/1996 Thomas et al. ........................ 73/23.32
5,596,975 1/1997 Thomas et al. ........................ 73/23.32
5,637,786 6/1997 Weber et al. .......................... 73/23.32

*Primary Examiner*—George Dombroske
*Attorney, Agent, or Firm*—Foley & Lardner

[57] ABSTRACT

In a heated type oxygen sensor having a sensing element responding to changes in the exhaust oxygen content and a heater inside, a diagnostic system for diagnosing deterioration of the heated type oxygen sensor comprises an electronic control unit being responsive to an engine temperature for discriminating whether the engine is in a cold-engine state or in a fully warmed-up state. The diagnostic system includes a first warm-up time setting circuit for setting a predetermined oxygen sensor's warm-up time at a first delay time which is preset to be suitable for the cold-engine state, during cold-engine operations, and a second warm-up time setting circuit for setting the predetermined oxygen sensor's warm-up time at a second delay time which is preprogrammed to be suitable for the fully warmed-up state, during fully warmed-up engine operations. The diagnostic system makes a diagnosis on deterioration of the oxygen sensor under a particular condition in which an elapsed time, measured from a time when the heater is turned on, reaches the predetermined oxygen sensor's warm-up time set depending on during cold-engine operation or during fully warmed up engine operation.

9 Claims, 5 Drawing Sheets

DIAGNOSTIC SYSTEM FOR DIAGNOSING DETERIORATION OF HEATED TYPE OXYGEN SENSOR FOR INTERNAL COMBUSTION ENGINES

The contents of Application No. TOKUGANHEI 8-300386, filed Nov. 12, 1996, in Japan is hereby incorporated by reference.

BACKGROUND OF THE INVENTION

1. Field of the Invention

The present invention relates to an electronic diagnostic system for making a diagnosis on deterioration or failure in a so-called heated type oxygen sensor for automotive engines, and specifically to technologies for diagnosing deterioration or failure in the heated type exhaust oxygen sensor only when the sensing element of the heated type oxygen sensor is fully activated and thus reaches operating temperature.

2. Description of the Prior Art

Today's automotive engines employ an exhaust oxygen sensor, simply called an $O_2$ sensor, which is located in either the engine exhaust manifold or exhaust piping to monitor the percentage of oxygen contained within the exhaust gases. As is well-known, the oxygen sensor is used as a feedback element in closed-loop engine control systems in which an air-fuel mixture ratio based on the oxygen sensor's signal is maintained at as close to stoichiometric as possible. On earlier model of cars, an ECM or ECU often includes an oxygen sensor failure diagnostic system for diagnosing deterioration of the oxygen sensor by comparison between a frequency of the oxygen sensor's signal and a predetermined reference frequency. One such $O_2$ sensor failure diagnostic system has been disclosed in Japanese Patent Provisional Publication No. 2-204648. Two types of oxygen sensors, namely an unheated type of $O_2$ sensor and a heated type of $O_2$ sensor, are in wide use on today's automotive vehicles employing an electronic control module (ECM) or an electronic engine control unit (ECU). The unheated type of oxygen sensor will not output a voltage signal to the on-board ECU until the sensing element has reached operating temperature. The engine is first started, the engine operates in a so-called open-loop condition (an open-loop mode), since the ECM ignores any voltage signals from the unheated oxygen sensor, and thus the engine operates in a preprogrammed ECU sequence. On the other hand, the heated type oxygen sensor is fully operational within 10 seconds of engine startup, regardless of the exhaust gas temperatures. In this manner, since the heated type oxygen sensor operates almost immediately, the engine can enter a so-called closed-loop condition (a closed-loop mode) quickly, allowing the ECM to maintain the engine air-fuel-mixture ratio at stoichiometric almost as soon as the engine is started. When the sensing element has not yet reached its operating temperature with the oxygen sensor's heater energized or activated at initial engine startup, the sensing element is in its in-active state. At this time, the diagnostic system cannot make an accurate diagnosis on deterioration of the oxygen sensor. For the reasons set out above, a conventional diagnostic system for a heated type oxygen sensor is designed to initiate to diagnose deterioration of the oxygen sensor when a predetermined elapsed time (hereinafter referred to simply as a "delay time"), measured from the beginning of activation of the oxygen sensor's heater (for example, from engine startup), has been reached. As seen in FIG. 5, the heater of the heated type oxygen sensor is generally de-energized or turned off in a specified high engine speed range and/or a specified high engine load range. A zone (as indicated by a blank area in FIG. 5) in which the heater is de-energized or turned off will be hereinafter referred to as a "heater de-energized zone" or "heater de-activated zone", whereas a zone (as indicated by a shadow area in FIG. 5) in which the heater is energized or turned on will be hereinafter referred to as a "heater energized zone" or "heater activated zone". In FIG. 5, a substantially central rectangular zone, which is defined by both a predetermined engine speed range and a predetermined engine load range, corresponds to a diagnostic permissible zone (simply diagnostic zone). In the prior art diagnostic system, even when there is a transition from the heater de-energized zone to the diagnostic permissible zone and thus the oxygen sensor has been already fully warmed up and thus reached its operating temperature, the prior art system is designed to begin to make a diagnosis on deterioration of the oxygen sensor from the time when the previously-noted predetermined delay time has been elapsed, in the same manner as a period of engine startup. As set forth above, in the prior art system, the predetermined delay time necessary for initiation of a desired diagnostic process for deterioration of the oxygen sensor, is fixed to a predetermined constant time, regardless of when the engine is started from cold or when the engine is fully warmed up.

SUMMARY OF THE INVENTION

The inventor of the present application has discovered that the previously-noted fixed delay time necessary for initiation of a desired diagnostic process results in decrease in the frequency of diagnoses, because the vehicle/engine operating conditions fluctuate constantly and become changed outside of the diagnostic permissible zone within the fixed delay time even during transition from the heater de-activated zone to the diagnostic zone.

Accordingly, it is an object of the invention to provide a diagnostic system for diagnosing deterioration of a heated type of oxygen sensor for internal combustion engines which avoids the aforementioned disadvantages of the prior art.

It is another object of the invention to provide a diagnostic system for diagnosing deterioration of a heated type of oxygen sensor for internal combustion engines, which prevents the frequency of diagnoses for deterioration of the oxygen sensor from decreasing by compensating for an unreasonable delay time (unreasonable oxygen sensor warm-up time) particularly at the time of transition from the heater de-activated zone to the diagnostic permissible zone.

In order to accomplish the aforementioned and other objects of the present invention, in a heated type oxygen sensor having a sensing element disposed in an exhaust passage for monitoring a content of oxygen contained within engine exhaust gases to generate an output signal in response to changes in the content of oxygen and a heating element inside for heating the sensing element, a diagnostic system for diagnosing deterioration of the oxygen sensor comprises a discrimination means being responsive to an engine temperature for discriminating that the engine is conditioned in one of a cold-engine state and a fully warmed-up state, a first warm-up time setting means being responsive to input information from the discrimination means, for setting a predetermined oxygen sensor's warm-up time at a first delay time which is preset to be suitable for the cold-engine state, only when the discrimination means determines that the engine is in the cold-engine state, a second warm-up time setting means being responsive to the input information from the discrimination means, for setting the predetermined oxygen sensor's warm-up time at a second delay time which is preprogrammed to be suitable for the fully warmed-up state, only when the discrimination means determines that the engine is in the fully warmed-up state, and a diagnostic means for executing a diagnosis on deterioration of the oxygen sensor under a particular condition in which an elapsed time, measured from a time when the heating element is turned on, reaches the predetermined oxygen sensor's warm-up time set by one of the first and second warm-up time setting means.

It is preferable that the second delay time may be preprogrammed in every engine operating region, which is partitioned depending on at least an engine speed and an engine load, and stored as a data map, and the second warm-up time setting means retrieves the second delay time from the data map, accounting for an engine operating condition including at least the engine speed and the engine load.

DESCRIPTION OF THE PREFERRED EMBODIMENTS

Figure 2:
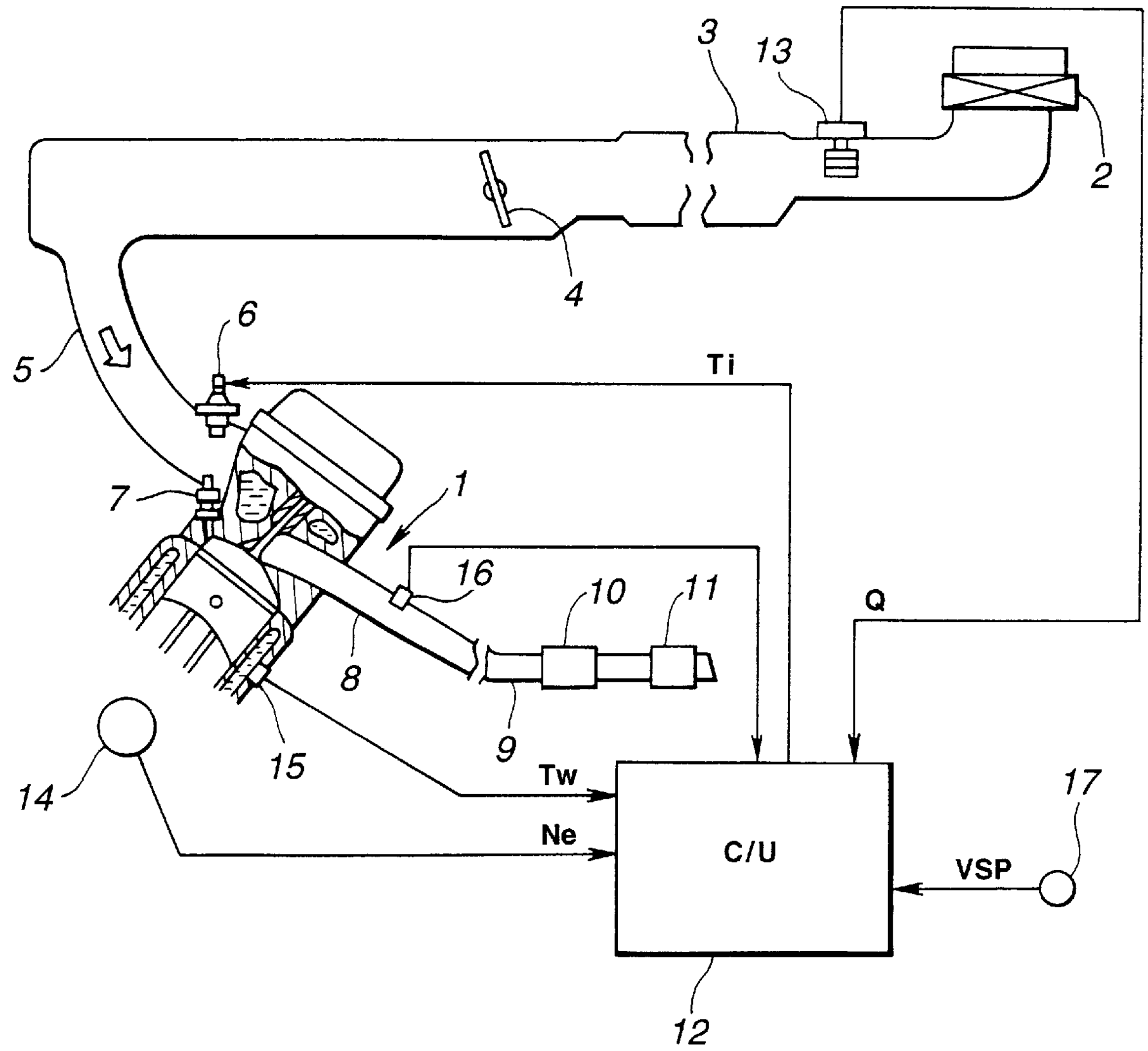
FIG. 2 is a diagnostic system operational diagram illustrating connection lines between an electronic control unit with the diagnostic system shown in FIG. 2 and various sensors.

Referring now to the drawings, particularly to FIG. 2, the diagnostic system of the invention is exemplified in case of an automotive spark-ignition type fuel-injected gasoline engine 1 which is controllable by means of an electronic engine control unit (C/U or ECU) 12. On the intake stroke, air flows from an air cleaner 2 through an intake-air duct 3 and a throttle valve 4 via an intake manifold 5 toward intake-valve ports. A plurality of fuel-injection valves 6 are provided in the corresponding branch pipes of the intake manifold to deliver the air-fuel mixture to the engine cylinders. Both the opening and closing of the electro-magnetic solenoid employed in each of the fuel-injection valves or fuel injectors 6 are conventionally controlled by way of a duty-cycle control (solenoid on and off time control). In more detail, each fuel-injection valve 6 is cyclically opened and closed in response to the fuel-injector pulse signal generated from the electronic control unit (C/U) 12 so that the injector 6 is opened during the solenoid on time period and is closed during the solenoid off time period. Fuel is pressurized by means of a fuel supply pump (not shown) and its pressure is regulated to a desired pressure level by a fuel pressure regulator (not shown). The pressure-regulated fuel is supplied to each individual fuel-injection valve 6 and then the injection valve sprays it into the intake manifold 5. In the shown embodiment, although the diagnostic system is exemplified in the typical fuel-injected gasoline engine, the diagnostic system of the invention may be applied to a so-called cylinder direct-injection type gasoline engine in which fuel is directly injected into the combustion chamber. On the combustion stroke, the air-fuel mixture is ignited by an electrical spark produced by a spark plug 7 provided at each individual combustion chamber. On the exhaust stroke, burnt gases are discharged from an exhaust valve (not numbered) through an exhaust manifold 8, an exhaust duct 9, a catalytic converter 10 and a muffler 11 to atmosphere.

Figure 3:
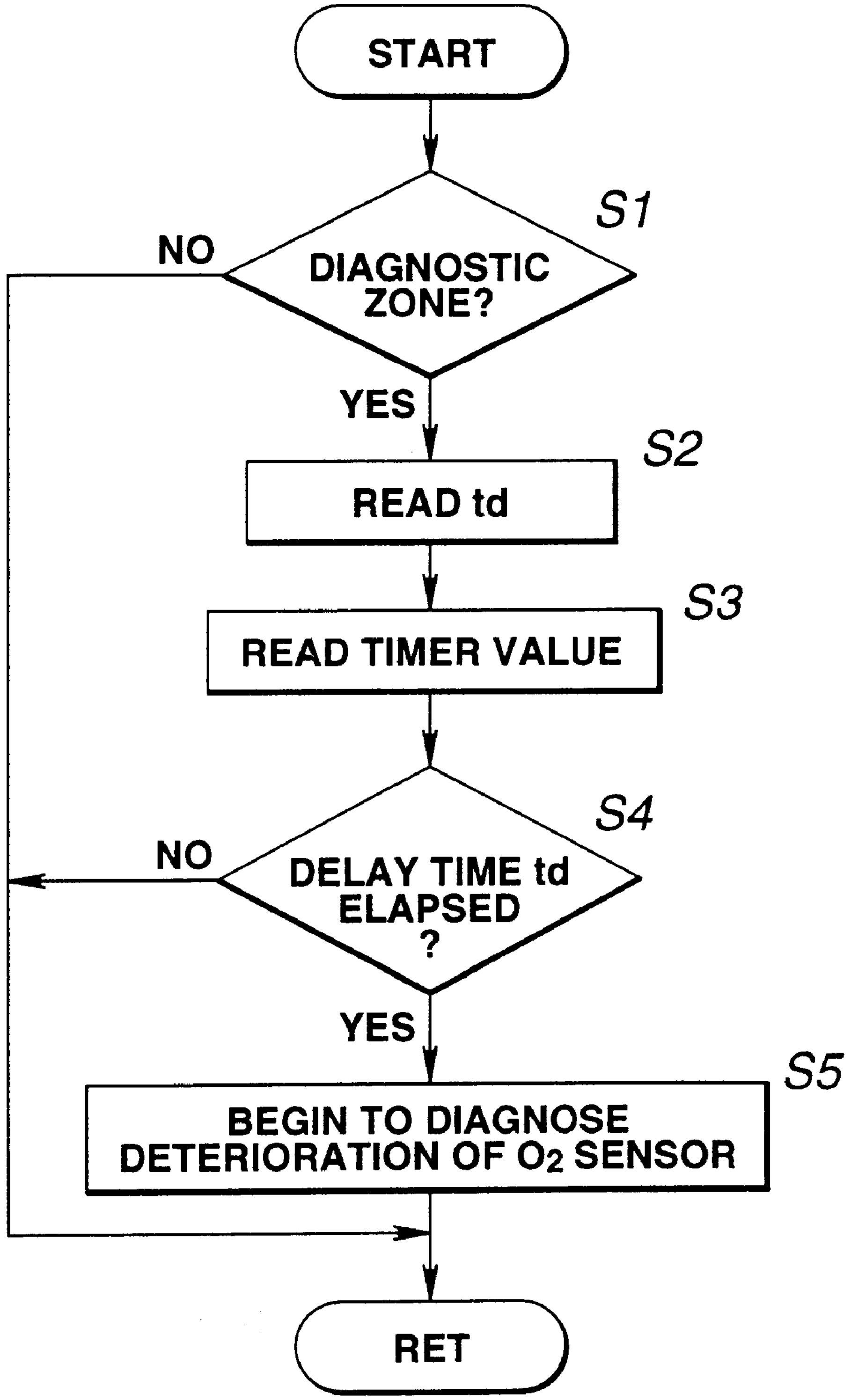
FIG. 3 is a flow chart illustrating a back-ground routine (or a main routine) for deterioration of the oxygen sensor, executed by the diagnostic system of the embodiment.
Figure 4:
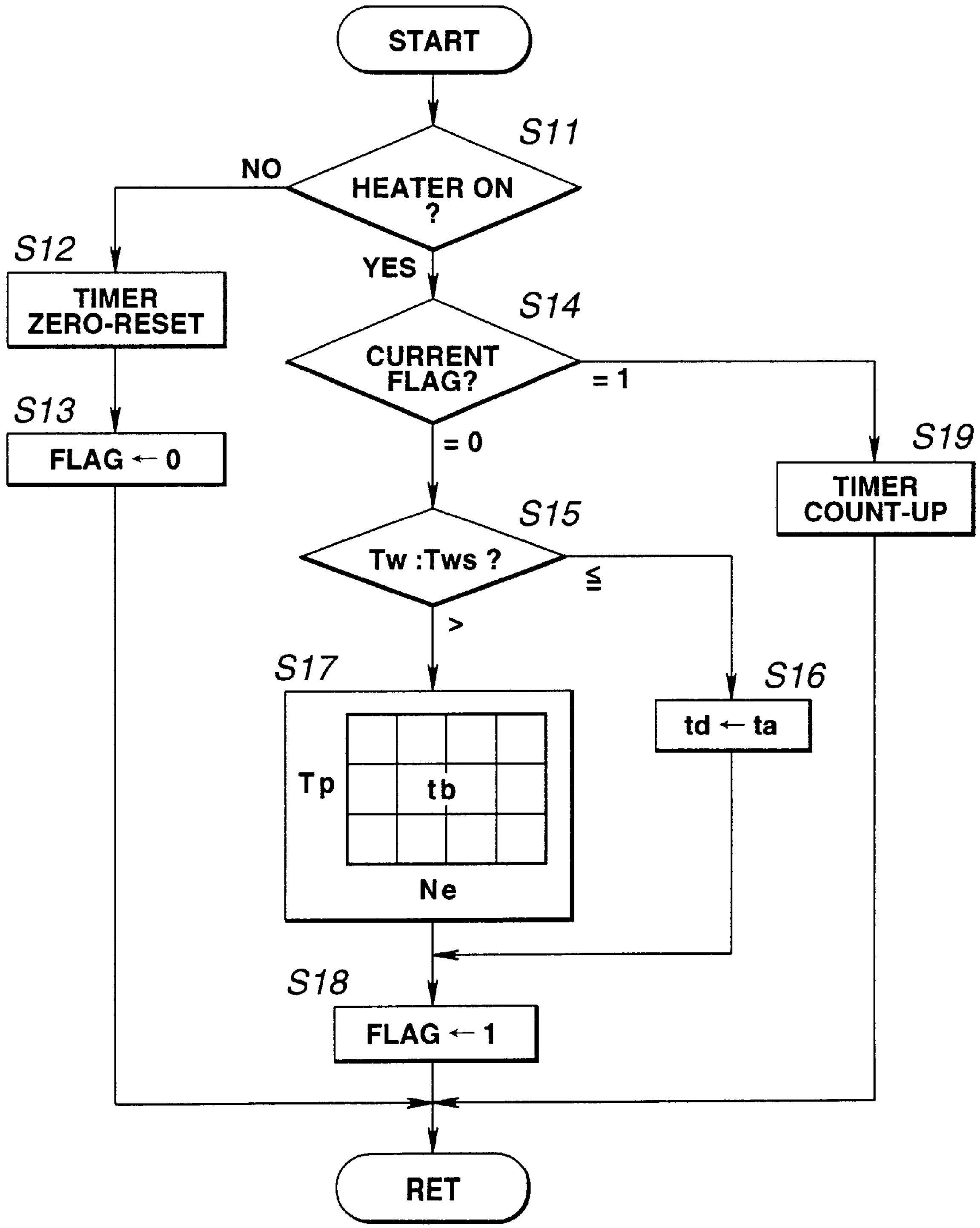
FIG. 4 is a flow chart illustrating a sub-routine necessary for measurement of an oxygen sensor's warm-up time (or a delay time) and setting of the delay time, related to the main routine shown in FIG. 3.
Figure 5:
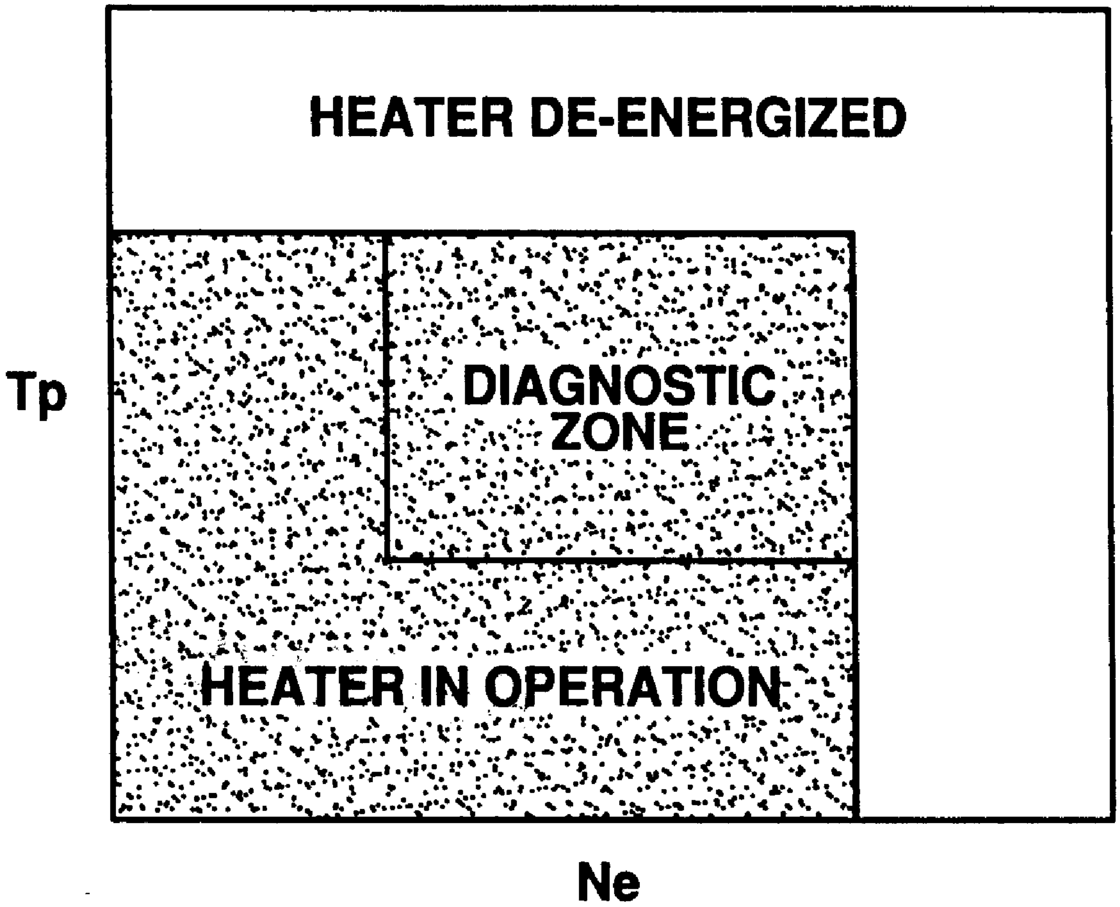
FIG. 5 is a chart illustrating the relationship between the heater de-activated zone and the heater activated zone, part of which involving the diagnostic permissible zone, at varying engine speeds denoted by Ne and loads denoted by Tp.

The control unit 12 usually comprises a microcomputer, which is generally constructed by an input interface circuit including an analog-to-digital (A/D) converter for converting an analog input information or data, such as each sensor signal from various vehicle sensors, to a digital signal, a central processing unit (CPU), memories (ROM, RAM) for pre-storing programs shown in FIGS. 3 and 4, and for permanently storing a predetermined, programmed information (see FIG. 5 and step S17 of FIG. 4) and for temporarily storing the results of ongoing arithmetic calculations (see FIGS. 3 and 4), and an output interface circuit generally including a digital-to-analog (D/A) converter and a special driver to handle or drive a larger load, that is, the electro-magnetic solenoids of the fuel-injection valves 6. The previously-noted input and output interface circuits can be constructed individually, or in lieu thereof integrally formed as an input/output interface unit. The CPU of the control unit 12 arithmetically calculates a fuel-injection amount Ti based on signals from various vehicle sensors. The E/U controls the opening and closing of the fuel-injection valves in accordance with the duty cycle essentially corresponding to the calculated fuel-injection amount Ti, thus turning them on for a longer or a shorter time each time they open. As seen in FIG. 2, the input interface circuit of the control unit receives a intake-air amount indicative signal Q from an air-flow meter 13, an engine-speed indicative signal Ne from a crank-angle sensor 14, a coolant-temperature indicative signal Tw from a water-temperature sensor 15. The water-temperature sensor 15 may be replaced with the other engine-temperature sensing elements such as an engine-oil temperature sensor. A heated-type exhaust oxygen sensor 16 is installed at the confluent portion of the exhaust manifold 8 and upstream of the catalytic converter 10, to monitor the percentage or content of oxygen contained within the engine exhaust gases. The output voltage signal generated from the oxygen sensor 16 varies in response to changes in the exhaust-gas oxygen content. Since the exhaust-gas oxygen content correlates with an air-fuel ratio of air-fuel mixture delivered to the combustion chamber, the oxygen sensor is used as a feedback element in closed-loop control systems in which an air-fuel mixture ratio based on the oxygen sensor's output signal (essentially corresponding to an actual air-fuel ratio) is maintained at as close to a stoichiometric ratio as possible for complete combustion and minimum exhaust emissions, at all times when the engine is running. In the shown embodiment, the oxygen sensor consists of a typical heated-type oxygen sensor. As is generally known, the oxygen sensor requires a minimum temperature, called an operating temperature, to operate properly. To reduce the oxygen sensor's warm-up time and to allow the closed-loop mode of operation to be initiated, the heated type oxygen sensor has an electric heating element (or a heater) inside, for heating the sensing element of the oxygen sensor. As seen in FIG. 5, on the heated type oxygen sensor 16, the heater de-energized zone and the heater energized zone are switched depending on the engine-speed indicative signal Ne and a basic fuel-injection amount Tp, and also part of the activated zone is designed to involve the diagnostic permissible zone. In a conventional manner, the heated-type oxygen sensor begins to energizes when the engine is started from cold to cause the oxygen sensor to reach its operating temperature more quickly. The heated-type oxygen sensor is de-energized in a specified high engine speed range and/or a specified high engine load range in which the exhaust-gas temperature is high enough to activate the sensing element of the oxygen sensor and the oxygen sensor is fully warmed up, in accordance with the chart shown in FIG. 5. A vehicle speed sensor denoted by 17 is provided for generating a vehicle-speed indicative signal VSP to the input interface circuit of the C/U 12. The CPU arithmetically calculates the basic fuel-injection amount Tp on the basis of the intake-air-amount indicative signal value Q (which is usually regarded as an equivalent value of engine load) and the engine speed indicative signal value Ne. When the C/U 12 determines that a predetermined feed-back control condition is satisfied, that is, if the engine and oxygen sensor reach operating temperature, the C/U 12 switches to closed loop mode and begins using the oxygen sensor's output signal to calculate the fuel-injector duty cycle or the fuel-injection amount Ti. Actually, the CPU of C/U 12 sets an air-fuel ratio feedback correction factor $\alpha$ necessary to compensate for the basic fuel-injection amount Tp such that the output signal generated from the oxygen sensor 16 is adjusted toward a desired air-fuel mixture ratio (a stoichiometric ratio). Then, the CPU determines a final fuel-injection amount Ti based on both the basic fuel-injection amount Tp and the feedback correction factor $\alpha$. The control unit (C/U) 12 also executes to diagnose deterioration of the oxygen sensor 16 for example by comparison between a frequency of the oxygen sensor's output signal and a predetermined reference frequency, according to the routines as shown in FIGS. 3 and 4 during the feedback control for the fuel-injection amount (or during the closed-loop mode).

Referring now to FIG. 3, there is shown a background routine for the oxygen-sensor deterioration diagnosis or fault detection, executed by the CPU of the control unit 12.

In step S1, the control unit 12 determines on the basis of both the engine-speed indicative signal value Ne and the calculated basic fuel-injection amount Tp as to whether the current engine/vehicle operating condition is within a predetermined diagnostic permissible zone (the substantially central rectangular zone shown in FIG. 5 and constructing a part of the heater energized zone of the heated type oxygen sensor 16). In the shown embodiment, although the diagnostic permissible zone is defined by both the engine speed (Ne) and the engine load (the basic fuel-injection amount Tp), the diagnostic permissible zone may be defined by the vehicle speed VSP detected by the vehicle-speed sensor 17, as well as the engine speed and load. When the answer to step S1 is in the affirmative (YES), that is, when the engine/vehicle operating condition is within the predetermined diagnostic permissible zone, step S2 is entered. In step S2, the delay time td, which is set through the sub-routine shown in FIG. 4 and is necessary for warming up the sensing element of the oxygen sensor, is read. Thereafter, in step S3, a "count" value of a timer employed in the CPU is read. The "count" value of the timer is counted up through the sub-routine of FIG. 4, as will be fully described later by reference to the flow chart of FIG. 4. Actually, the count value of the timer tells the control unit how long the heater of the oxygen sensor 16 is continued to energize or activate. That is, the timer count value indicates the elapsed time, measured from the time when activation of the heater of the oxygen sensor initiates. Then, step S4 is entered. In step S4, a test is made to determine whether the delay time set through the sub-routine of FIG. 4 has been elapsed by comparison between the timer count value read at step S3 and the set delay time td. When the answer to step S4 is affirmative (YES), i.e., the elapsed time measured from the beginning of activation of the oxygen sensor's heater reaches the set delay time td, the control unit (C/U) 12 decides that the sensing element of the oxygen sensor has been fully warmed up and reached its operating temperature. Thereafter, step S5 proceeds in which the oxygen-sensor deterioration diagnostic process is initiated. As an example of the diagnostic process of step S5, the control unit makes a diagnosis on the presence or absence of deterioration of the oxygen sensor 16 by comparison between a frequency of the oxygen sensor's signal and a predetermined reference frequency based on engine load and speed. In the embodiment, the oxygen sensor's deterioration diagnostics or fault detection is detected by comparison between the frequency of the oxygen sensor's signal and the predetermined reference frequency, such diagnostics or fault detection may be performed by comparing a signal value of the oxygen sensor's output signal with a predetermined voltage criterion. Returning to step S1, when the answer to step S1 is in the negative (NO), that is, when the engine/vehicle operating condition is not within the predetermined diagnostic permissible zone, the current back-ground routine terminates. Also, when the answer to step S4 is negative (NO), the routine terminates. In this manner, the back-ground routine is repeatedly executed at predetermined execution cycles.

Referring to FIG. 4, there is shown the sub-routine for setting the oxygen sensor's warm-up time (the delay time) and for measuring as to whether the oxygen sensor's warm-up time (the set delay time td) has been elapsed. The sub-routine is usually executed as time-triggered interrupt routines to be triggered every predetermined intervals.

In step S11, a test is made to determine whether the heater of the oxygen sensor 16 is energized (or turned on). When the answer to step S11 is affirmative (YES), step S14 occurs. In step S14, a test is made to determine whether a flag is set to "1" or reset to "0". As may be appreciated from the flow from step S11 via step S12 to step S13, when the heater is de-energized (or turned off), the "count" value of the timer is reset to "0" at step S12 and then the flag is reset to "0" at step S13, to inhibit the oxygen-sensor deterioration diagnostic process from being executed outside of the predetermined diagnostic permissible zone. Therefore, with the heater turned on, the flag remaining at "0" means a timing of initiation of activation of the oxygen sensor's heater. In the case that the heater is turned on and simultaneously the flag is reset at "0", step S15 is entered. In step S15, a check is made to determine whether the detected value of coolant temperature Tw detected by the water-temperature sensor 15 is greater than a predetermined reference water temperature Tws. In case of Tw>Tws, the control unit determines that the engine 1 is conditioned in the fully warmed-up state. On the contrary, in case of Tw≦Tws, the control unit determines that the engine 1 is conditioned in the cold-engine state. When the detected temperature Tw is equal to or less than the predetermined reference water temperature Tws, step S16 occurs. In step S16, the delay time (or the oxygen sensor's warm-up time) is set at a predetermined delay time ta suitable for the cold-engine state. The predetermined delay time ta is pre-stored in the corresponding memory address of the memory of the control unit. In the shown embodiment, the delay time ta is fixed to a predetermined constant time. Thus, during the cold-engine state (in case of Tw≦Tws), the predetermined delay time ta is used as a delay time td read at step S2 of FIG. 3. Conversely, when the detected temperature Tw is greater than the predetermined reference water temperature Tws and thus the control unit 12 decides that engine is conditioned in the fully warmed-up state, step S17 occurs. In step S17, the CPU of the control unit 12 retrieves a preprogrammed delay time tb as the predetermined delay time in every engine operating region, which is partitioned depending on at least an engine speed Ne and an engine load (i.e., the basic fuel-injection amount Tp regarded as the engine-load equivalent value), from the data map (or the lookup table) shown in step S17 of FIG. 4. That is, the plural partitioned engine operating regions have the respective preprogrammed delay times tb different from each other. All of the preprogrammed delay times are selected to match the fully warmed-up state, accounting for both the engine speed and the engine load, and pre-stored in corresponding memory addresses of the memory (ROM) in the form of the map. As can be appreciated, during the full warm-up state (in case of Tw>Tws), the set delay time tb (see step S17) is used as a delay time td read at step S2 of FIG. 3. After setting of the delay time td at steps S16 or S17, step S18 is entered. In step S18, the flag is set at "1". In this manner, after the heater begins to energize and then the flag becomes set at "1", the procedure flows from step S11 through step S14 to step S19. In step S19, the "count" value of the timer of the CPU is incremented or counted up by "1" for example. As a result of the counting-up operation of the timer, an elapsed time (corresponding to a heater activation time period) can be measured as the "count" value of the timer from the beginning of activation of the heater of the oxygen sensor 16. In the embodiment, each of the preprogrammed delay times tb (preprogrammed to be suitable for the previously-noted full warm-up state) is set to be shorter than the predetermined delay time ta (preset to be suitable for the previously-noted cold-engine state) to reasonably set the oxygen sensor's warm-up time.

Figure 1:
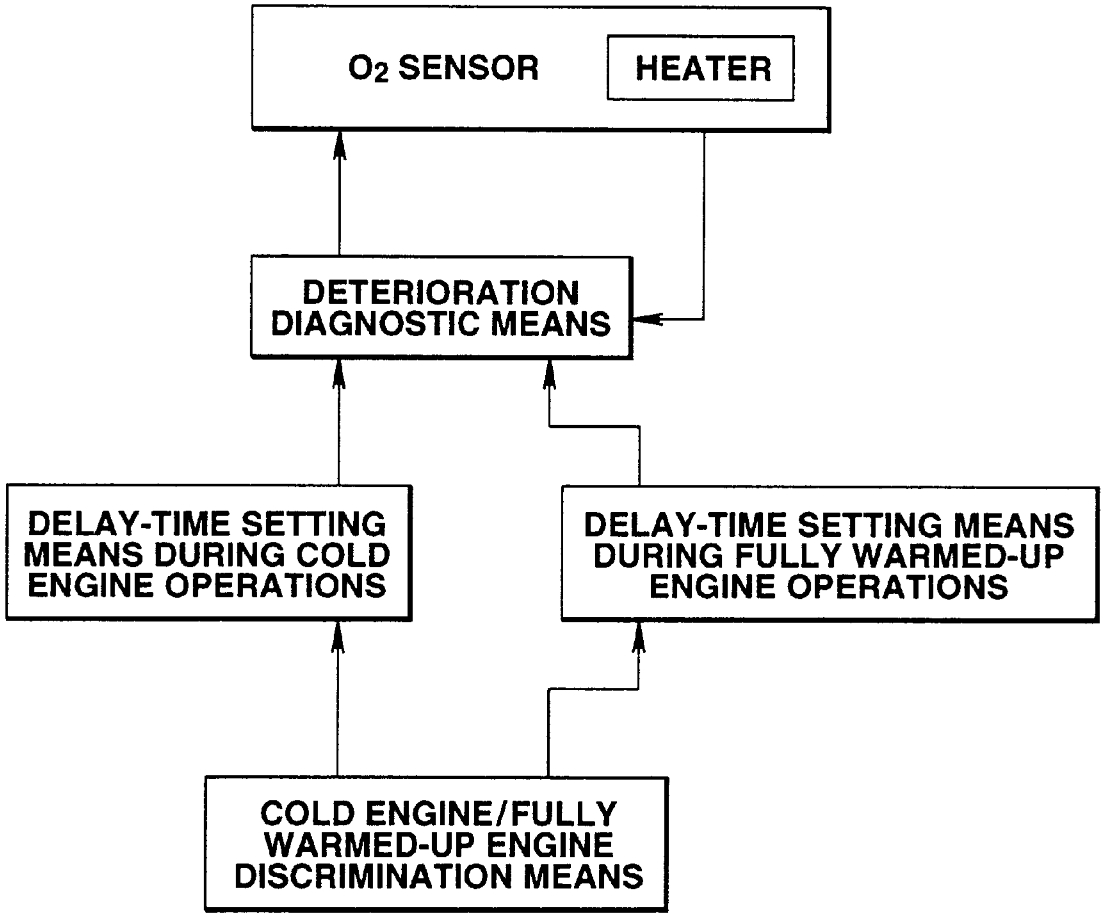
FIG. 1 is an operational block diagram illustrating a fundamental concept of a diagnostic system for diagnosing deterioration of a heated type of oxygen sensor, according to the invention.

As will be appreciated from the above, when the engine is started from cold and thus the oxygen sensor's heater begins to energize, the delay time or oxygen sensor's warm-up time td is set at the predetermined delay time ta so that the heater continues to energize for a comparatively long period of time in comparison with the previously-noted fully warmed-up state. When the CPU determines that the engine is conditioned in the previously-noted full warm-up state (see the flow from step S15 to step S17) in which the sensing element of the oxygen sensor 16 may reach the operating temperature for a comparatively short time period even if the heater is reheated after turned off or de-energized once, the delay time or warm-up time td is set at the preprogrammed delay time tb in every engine operating region, based on at least the engine speed and the engine load. As set out above, the delay time or oxygen sensor's warm-up time td is variably set or controlled depending on the engine load and speed as well as by whether the engine is conditioned in the cold-engine state or in the fully warmed-up state. Therefore, in the event that the heater of the oxygen sensor is reheated owing to a transition from the heater de-energized zone to the diagnostic zone (included in the heater energized zone) after the heater has been temporarily de-energized in the full warm-up state, the delay time td is set at the preprogrammed delay time tb in every engine operating region, accounting for the engine speed (Ne) and load (Tp) in accordance with the flow from step S11 through steps S14 and S15 to step S17, thus avoiding an unreasonably long delay time such as the predetermined delay time ta, which is selectable in the cold-engine state for example during engine startup, from being set as an oxygen sensor's warm-up time. As a result, in various engine/vehicle operating conditions, including a transition from the heater de-energized zone (the full warm-up state) to the diagnostic zone, the diagnostic system of the invention can increase the frequency of diagnoses of the oxygen sensor's deterioration. As appreciated from the operational block diagram shown in FIG. 1, the heated type oxygen sensor's deterioration diagnostic system of the invention comprises a cold-engine/full-warm-up discrimination means, a first delay-time setting means, a second delay-time setting means, and a deterioration diagnostic means. Briefly, the diagnostic system of the invention operates as follows. That is, the cold-engine/full-warm-up discrimination means is responsive to an engine temperature for discriminating or determining whether the engine is in a cold-engine state or in a fully warmed-up state. The first delay-time setting means is responsive to input information from the cold-engine/full-warm-up discrimination means, for setting a predetermined delay time (or a predetermined oxygen sensor's warm-up time) at a first delay time (or a first warm-up time ta) preset to be suitable for the cold-engine state, only when the cold-engine/full-warm-up discrimination means determines that the engine is in the cold-engine state. The second delay-time setting means is responsive to the input information from the cold-engine/full-warm-up discrimination means, for setting the predetermined delay time at a second delay time (or a second warm-up time tb) preprogrammed to be suitable for the fully warmed-up state, only when the cold-engine/full-warm-up discrimination means determines that the engine is in the fully warmed-up state. Thus, the predetermined delay-time for the oxygen sensor can be reasonably set depending on during cold-engine operations or during fully warmed-up engine operations. The deterioration diagnostic means executes a diagnosis on deterioration of the oxygen sensor under a particular condition in which an elapsed time, measured from a time when the heater of the oxygen sensor is turned on, reaches the predetermined delay time variably set depending on during cold-engine operations or during fully warmed-up engine operations.

While the foregoing is a description of the preferred embodiments for carrying out the invention, it will be understood that the invention is not limited to the particular embodiments shown and described herein, but that various changes and modifications may be made without departing from the scope or spirit of this invention as defined by the following claims.

What is claimed is:

1. In a heated type oxygen sensor having a sensing element disposed in an exhaust passage for monitoring a content of oxygen contained within engine exhaust gases to generate an output signal in response to changes in the content of oxygen and a heating element inside for heating the sensing element, a diagnostic system for diagnosing deterioration of the oxygen sensor, comprising:

a diagnostic zone setting means for setting a diagnostic zone;

a discrimination means being responsive to an engine temperature for discriminating that the engine is conditioned in one of a cold-engine state and a fully warmed-up state;

a first warm-up time setting means being responsive to input information from said discrimination means, for setting a predetermined oxygen sensor's warm-up time at a first delay time (ta) which is preset to be suitable for the cold-engine state, only when said discrimination means determines that the engine is in the cold-engine state, and there is a transition from a heater energization zone to the diagnostic zone;

a second warm-up time setting means being responsive to the input information from said discrimination means, for setting said predetermined oxygen sensor's warm-up time at a second delay time (tb) which is preprogrammed to be suitable for the fully warmed-up state, only when said discrimination means determines that the engine is in the fully warmed-up state, and there is a transition from a heater de-energization zone to the diagnostic zone; and a diagnostic means for executing a diagnosis on deterioration of the oxygen sensor under a particular condition in which an elapsed time, measured from a time when the heating element is turned on, reaches said predetermined oxygen sensor's warm-up time set by one of said first and second warm-up setting means.

2. The diagnostic system as claimed in claim 1, wherein said second delay time is preprogrammed in every engine operating region, which is partitioned depending on at least an engine speed and an engine load, and stored as a data map, and said second warm-up time setting means retrieves said second delay time from said data map, accounting for an engine operating condition including at least the engine speed and the engine load.

3. The diagnostic system as claimed in claim 1, said first delay time is fixed to a predetermined constant time.

4. The diagnostic system as claimed in claim 2, said second delay time is set to be shorter than said first delay time.

5. The diagnostic system as claimed in claim 1, which further comprises a water temperature sensor for detecting a coolant temperature as said engine temperature, and said discrimination means determines that the engine is in the cold-engine state when the coolant temperature detected by said water temperature sensor is below a predetermined reference water temperature, and that the engine is in the fully warmed-up state when the coolant temperature is above the predetermined reference water temperature.

6. The diagnostic system as claimed in claim 1, wherein said diagnostic means includes comparison means for comparing said elapsed time with said predetermined oxygen sensor's warm-up time set by one of said first and second warm-up time setting means, and said diagnostic means decides that the sensing element of the heated type oxygen sensor has reached an operating temperature when said comparison means determines that said elapsed time is above said predetermined oxygen sensor's warm-up time, and simultaneously begins to make a diagnosis on deterioration of the heated type oxygen sensor on the basis of a signal generated from the heated type oxygen sensor.

7. The diagnostic system as claimed in claim 6, wherein said diagnostic means diagnoses deterioration of the heated type oxygen sensor by comparison between a frequency of the signal from the oxygen sensor and a predetermined reference frequency, only when said elapsed time is above said predetermined oxygen sensor's warm-up time.

8. The diagnostic system as claimed in claim 1, wherein said diagnostic zone is defined as part of the heater energization zone being below a specified engine speed and below a specified engine load, and borders the heater de-energization zone being above the specified engine speed or above the specified engine load.

9. A method for diagnosing deterioration of a heated type oxygen sensor, wherein the oxygen sensor includes a sensing element disposed in an exhaust passage for monitoring a content of oxygen contained within engine exhaust gases to generate an output signal in response to changes in the content of oxygen and a heating element inside for heating the sensing element, the method comprising:

setting a diagnostic zone;

discriminating, responsively to an engine temperature, that an engine is conditioned in one of a cold-engine state and a fully warmed-up state;

setting, responsively to input information regarding which state the engine is in, an oxygen sensor's warm-up time at a first delay time (ta) which is preset to be suitable for the cold-engine state, only when it is discriminated that the engine is in the cold-engine state, and there is a transition from a heater energization zone to the diagnostic zone;

setting, responsively to the input information regarding which state the engine is in, said oxygen sensor's warm-up time at a second delay time (tb) which is preprogrammed to be suitable for the fully warmed-up state, only when it is discriminated that the engine is in the fully warmed-up state, and there is a transition from a heater de-energization zone to the diagnostic zone; and executing a diagnosis on deterioration of the oxygen sensor under a particular condition in which an elapsed time, measured from a time when the heating element is turned on, reaches said oxygen sensor's warm-up time set to either the first delay time or the second delay time.

* * * * *